Figure 1:
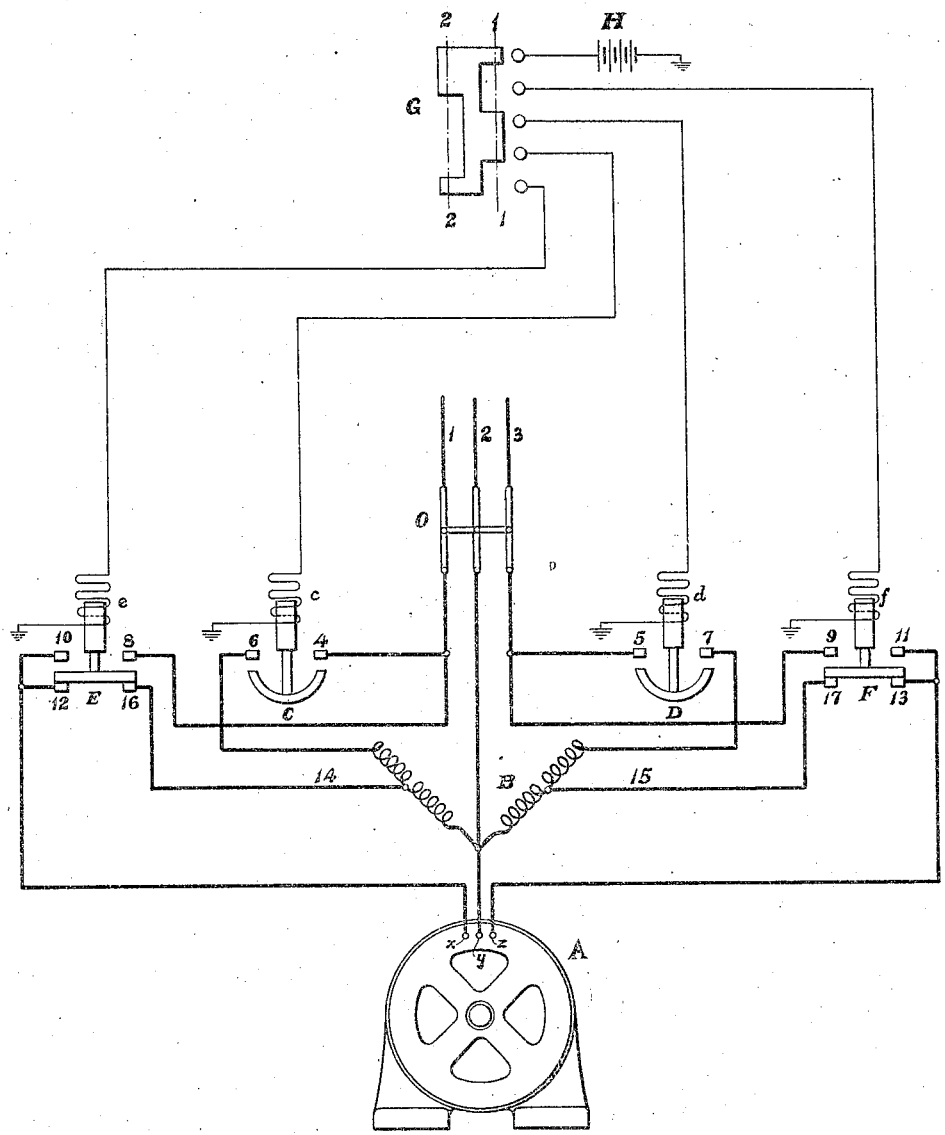

No. 850,277. PATENTED APR. 16, 1907.
C. R. TATEM.
SYSTEM OF MOTOR CONTROL.
APPLICATION FILED MAR. 31, 1906.

2 SHEETS—SHEET 1.

WITNESSES

INVENTOR
C.R. Tatem.
BY
ATTORNEY

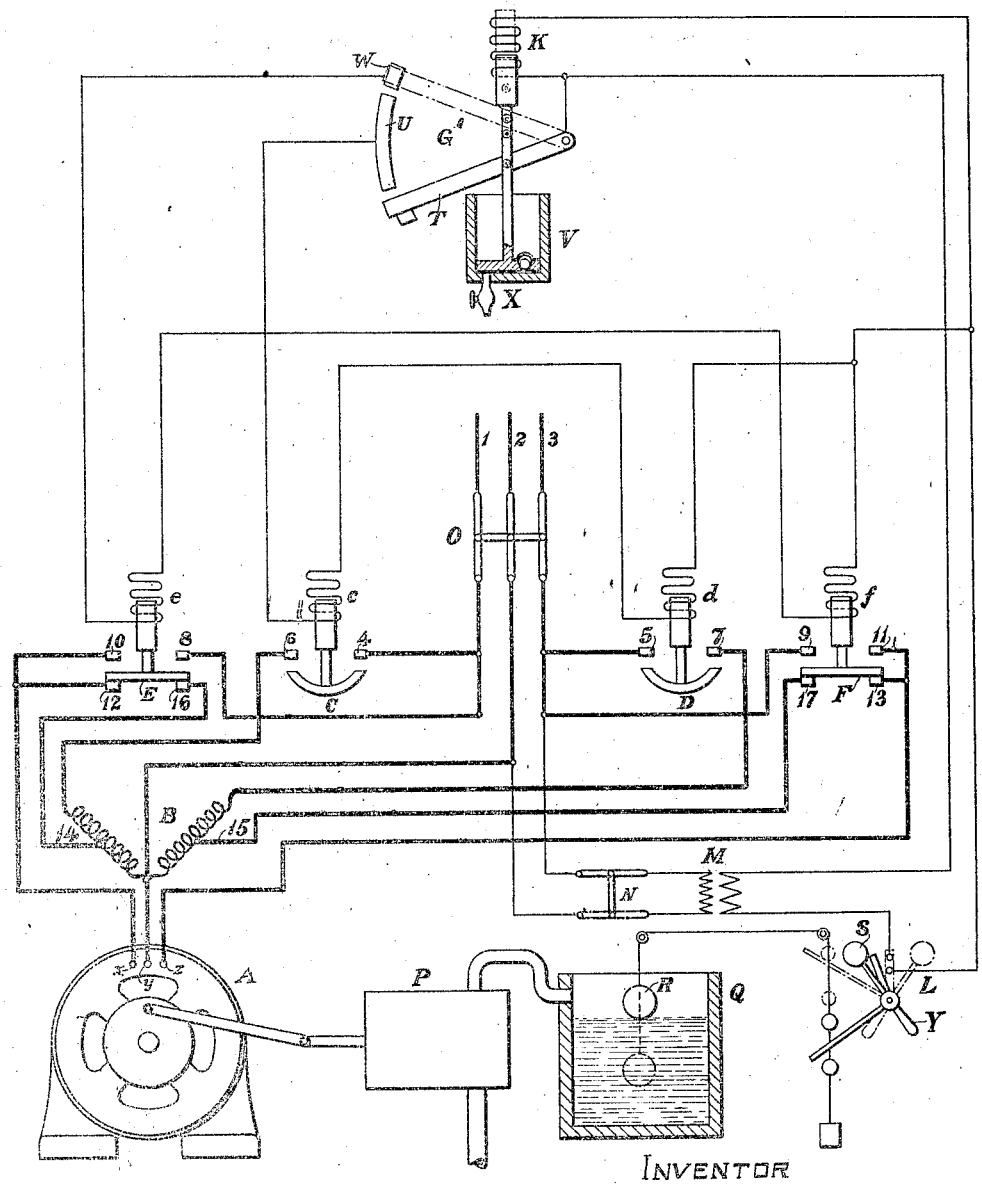

UNITED STATES PATENT OFFICE.

CLIFFORD ROSS TATEM, OF BUFFALO, NEW YORK, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

SYSTEM OF MOTOR CONTROL.

No. 850,277.     Specification of Letters Patent.     Patented April 16, 1907.

Application filed March 31, 1906. Serial No. 309,018.

*To all whom it may concern:*

Be it known that I, CLIFFORD ROSS TATEM, a citizen of New York, residing at Buffalo, in the county of Erie and State of New York, have invented certain new and useful Improvements in Systems of Motor Control, of which the following is a full, clear, and exact specification.

My invention relates to starting devices for motors, and more particularly to automatic devices for safely starting and stopping polyphase motors. In starting devices of this nature it is desirable to supply the motor with current at a low voltage at first and then after the motor has reached a certain speed to supply the current at full voltage. Devices of this sort are common in direct-current motors where generally a resistance is included in the armature-circuit at starting, this resistance being gradually cut out as the motor speeds up. In alternating-current motors such a resistance has been used in the rotor-circuit and has been adapted to be cut out as the motor gains speed. In all of these there is a certain loss of energy in the resistance, while with my invention this loss is greatly reduced.

The object of my invention is to simplify the construction of a starting-controller for motors of large capacity, the controller being either automatically or manually operated, and to reduce to a minimum the loss of energy in the starting apparatus.

My invention consists of a plurality of separately-actuated contacts for first supplying an alternating-current motor with a current at reduced voltage through transformer-windings and later supplying it with a current at the full voltage directly from the line.

More specifically considered, my invention consists of a three-phase induction-motor, a three-phase V-connected autotransformer, a main motor-controller consisting of a plurality of solenoid-switches, a master-controller for the solenoid-switches having contacts so connected and arranged that in one position of the master-controller circuits are completed through the solenoids of certain of said switches to connect the ends of the autotransformer-windings to two of the mains and in another position, through the solenoids of others of said switches, to connect the motor-terminals directly to the mains, the last-mentioned switches being so arranged and constructed that when their solenoids are deënergized they connect the motor-terminals to taps from the autotransformer-windings. The master-controller may be manually operated; but preferably it is operated by a solenoid which may be controlled from a distance by hand or automatically, as by a float or other fluid-pressure switch. In the latter case the motor may operate a pump to supply fluid to a reservoir, the fluid level or pressure determining the opening and closing of the fluid-pressure switch.

The invention comprises certain other details and combinations, which will be hereinafter described and will appear in the claims at the end of this specification.

In the drawings, Figure 1 is a diagram showing my invention as used with a manually-operated master-controller; and Fig. 2 is a similar diagram showing a fluid-operated switch controlling the master-controller, the whole operation being automatic and the motor driving a pump.

In both figures, A is an electric motor and is shown as a three-phase induction-motor, although my invention is not limited to such a motor, but may be applied to a motor of any desired type. The motor is supplied with current from the mains 1, 2, and 3, the main 2 being permanently connected directly to one terminal $y$ of the motor and to the middle or angle of the windings of a V-connected autotransformer B. The mains 1 and 3 are connected, respectively, to the stationary contacts 4 and 5 of one group or pair of magnetic switches C and D, the other stationary contacts 6 and 7 of these switches being connected, respectively, to the two ends of the winding of the autotransformer B. The mains 1 and 3 are also directly connected to the stationary contacts 8 and 9, respectively, of a second group or pair of magnetic switches E and F. The contacts 10 and 12 of the switch E are connected together and to motor-terminal $x$, and contacts 11 and 13 of switch F are similarly connected together and to the remaining motor-terminal $z$. From intermediate points of the windings of the autotransformer are led taps 14 and 15, which are connected, respectively, to the contacts 16 and 17 of the switches E and F. For the sake of simplicity only one tap on each leg of the transformer is shown; but it is obvious that any desired number might be used, provided the requisite number of groups or pairs of magnetic switches were employed. The switches E and F are normally in their lower positions and connect together the contacts 12 and 16 and 13 and 17, respectively, thereby connecting the motor-terminals $x$ and $z$ to the taps 14 and 15 of the autotransformer-windings. The switches C, D, E, and F constitute the main motor-controller.

The switches C, D, E, and F are operated by solenoids $c$, $d$, $e$, and $f$, respectively. These solenoids are supplied either with direct current, as shown in Fig. 1, or with alternating current, as shown in Fig. 2. In Fig. 1 these solenoids are controlled by a manually-operated master-controller G, which may be of any desired type, but which is here illustrated as of the drum type. This controller in position 1 1 connects the solenoids $c$ and $d$ to the battery H, the two solenoids in this instance being connected in parallel. In position 2 2 of the master-controller the solenoids $e$ and $f$ are connected to the battery H, these solenoids being also connected in parallel. Although I have shown a battery as a source of current for the controlling-solenoids, it is obvious that any other source of current might be used. In Fig. 1 one terminal of each solenoid and of the battery is shown connected to ground, though it is obvious that any other method of completing the circuit might be used.

The operation of the arrangement shown in Fig. 1 is as follows: When the master-controller is in off position, all of the solenoids are deënergized and the switches of the main motor-controller are in the positions shown in the drawings. When the controller is moved into position 1 1, the solenoids $c$ and $d$ are energized and the switches C and D raised. This connects the mains 1 and 3 to the ends of the windings of the autotransformer B, the taps 14 and 15 being, as before starting, connected to the terminals $x$ and $z$ of the motor A by reason of the switches E and F being in their lower positions. The main 2 being permanently connected to the terminal $y$ of the motor, the motor is now supplied through the autotransformer with current at a voltage bearing a certain ratio to the voltage of the mains 1, 2, and 3, this ratio being determined by the points of connection of the taps 14 and 15 to the autotransformer-windings. When the motor reaches the desired speed, the controller is moved into position 2 2, the solenoids $e$ and $f$ are energized, and the solenoids $c$ and $d$ deënergized. The switches E and F are now closed by the solenoids $e$ and $f$, and the mains 1 and 3 connected directly to the motor-terminals $x$ and $z$, thereby supplying the motor directly from and with the full potential of the mains. The upward movement of the switches E and F opens the connections of the taps 14 and 15 with the motor, so that no portion of the autotransformer is ever short-circuited. The deënergization of the solenoids $c$ and $d$ causes the switches C and D to open, thereby disconnecting the autotransformer from the line, so that no current will be wasted therein after its purpose has been served. During the movement of the master-controller from position 1 1 to position 2 2 the solenoids $c$, $d$, $e$, and $f$ are all energized; but this simultaneous energization is only momentary, and if the switches E and F are closed in their upper position before the switches C and E drop the self-induction of the autotransformer with the taps 14 and 15 open is sufficient to prevent any except a very small current flowing therethrough, and therefore practically no loss of energy takes place. It is obvious that the master-controller could be so constructed as to open the circuits of solenoids $c$ and $d$ before closing those of solenoids $e$ and $f$, thereby preventing even this small loss.

In Fig. 2 the master-controller G' is of a type different from that of the one shown in Fig. 1 and is operated by means of a solenoid K, which in turn is controlled by a fluid-operated snap-switch L of any desired type. The switch L also controls the circuits of the solenoids $c$, $d$, $e$, and $f$. In the arrangement shown in this figure the solenoids $c$ and $d$ are in series, as are also the solenoids $e$ and $f$. Instead of supplying the controlling-circuit with direct current, as in Fig. 1, it is here supplied by one of the phases of the alternating current, though it is obvious that direct current could be here used and that alternating current could be used in the modification shown in Fig. 1.

The voltage in the controlling-circuit may be reduced for purposes of safety by means of a step-down transformer M. In the controlling-circuit is a hand-switch N, and in the main supply-circuit is a hand-switch O for the purpose of entirely disconnecting the devices here shown from the main source of current-supply. The motor A operates a pump P, which supplies water or other fluid to the reservoir or tank Q, the level of the liquid in said tank controlling the position of the float R, which in turn operates the snap-switch L. When the liquid-level in the tank reaches the lower level for which the switch L is set, the weight S of the switch is tilted to the right of the vertical and closes the snap-switch. This completes the circuit of solenoid K, which moves the arm T upward and brings it into contact with the segment U, thus closing the circuit of solenoids $c$ and $d$, which act, as in Fig. 1, to connect the mains 1 and 3 to the ends of the autotransformer B, and thereby to supply the motor with a lower potential than that of the lines. The upward movement of the arm T being retarded by a dash-pot V, a certain time is required for it to pass over the segment U, and this allows the motor to reach a certain speed before the arm leaves segment U. The time required for the upward movement of arm T may be regulated, as by a petcock X. When the motor has attained a sufficient speed, the arm T comes into contact with segment W, thus energizing the solenoids e and f, the latter by raising the switches E and F connecting the motor-terminals x and z directly to the mains 1 and 3 and disconnecting them from the taps 14 and 15. When the arm leaves the segment U, the solenoids c and d are deënergized and allow the switches C and D to drop, thus preventing waste of current in the windings of the autotransformer. The motor continues to operate the pump until the liquid reaches the upper level for which the switch is set, when the tilting of the weight S to the left opens the snap-switch L and deënergizes the solenoids e and f. The switches E and F then open and the arm T descends, the dash-pot being arranged in any well-known manner so as not to retard the downward movement of the arm. As the arm descends and slides over the segment U, the solenoids c and d are not energized, because their circuit is opened at the switch L. The snap-switch L may be provided with a handle Y, which may be used in conjunction with the float to give a manual control or independently thereof to control the operation of the motor from a distance.

Although I have shown my invention as applied to three-phase induction-motors, it will be obvious that it is equally applicable to motors of any other type, such as single-phase or two-phase, and although for the sake of simplicity I have shown an arrangement in which the motor is supplied with current in but two steps it is obvious that any number of steps may be used by varying the number of autotransformer-taps and magnetic switches, and it is clear that any sort of fluid-pressure may control the operation of the device and that the device is not limited to the control of liquids, and it is obvious that the series solenoid connection shown in Fig. 2 may be used with the hand-control arrangement of Fig. 1 and the parallel solenoid connections with the automatically-operated master-controller of Fig. 2. It is also clear that either the battery or other direct-current source or any alternating-current source, such as the one shown in Fig. 2, may be used to supply the controlling-current in either modification.

Having thus described my invention, what I claim as new is—

1. In a starter for electric motors, a motor, main supply-conductors, an autotransformer, taps from the autotransformer, electrically-operated switches for first connecting the autotransformer to the main conductors and the taps from the autotransformer to the motor, and then connecting the motor directly to the main conductors.

2. In a starter for electric motors, a motor, main conductors, an autotransformer, taps from the autotransformer, and electrically-operated switches for first connecting the autotransformer to the main conductors and the taps from the autotransformer to the motor, and then connecting the motor directly to the main conductors and cutting out the autotransformer.

3. A starter for electric motors, comprising an induction-motor, an autotransformer, a tap therefrom, a plurality of magnetic switches, one of said switches adapted when energized to connect one end of the transformer to the line, and another of said switches adapted when deënergized to connect one motor-terminal to the tap from the autotransformer, and when energized to connect said motor-terminal to the line.

4. In combination, an induction-motor, a supply-circuit, a transformer, a plurality of automatically-operated switches for first connecting the motor to the supply-circuit through the transformer and then connecting the motor directly to the supply-circuit.

5. In combination, an alternating-current electric motor, an alternating-current-supply circuit, a transformer, a plurality of separately-actuated switches for first connecting the motor to the supply-circuit through the transformer and then connecting the motor directly to the supply-circuit.

6. In combination, an alternating-current motor, an alternating-current-supply circuit, a transformer, a plurality of automatically-operated switches for first connecting the motor to the supply-circuit through the transformer and then connecting the motor directly to the supply-circuit.

7. In combination, an induction-motor, a supply-circuit, a transformer, a plurality of magnetic switches, a master-controller for the magnetic switches, the master-controller in one position causing the magnetic switches to connect the motor to the supply-circuit through the transformer and in another position causing the magnetic switches to connect the motor directly to the supply-circuit.

8. In combination, an alternating-current motor, an alternating-current-supply circuit, a transformer, a plurality of magnetic switches, a master-controller for the magnetic switches, the master-controller in one position causing the magnetic switches to connect the motor to the supply-circuit through the transformer and in another position causing the magnetic switches to connect the motor directly to the supply-circuit.

9. A main motor-controller, comprising a plurality of separately-actuated contacts, a master controlling device for said main motor-controller, a source of current-supply, an electric motor, a transformer, and connections whereby when the master-controller is in one position the contacts are actuated to connect the motor to the source of supply by means of the transformer and when in another position the contacts are actuated to connect the motor directly to the source of supply.

10. A source of current-supply, an electric motor, a pump driven thereby and supplying fluid to a reservoir, a switch controlled by the fluid in the reservoir, an automatically-operated master-controller controlled by the fluid-operated switch, autotransformer-windings, and means controlled by the master-controller for first connecting the motor to the source of current-supply through the autotransformer-windings and then connecting the motor directly to the source of supply.

11. A source of current-supply, an electric motor, a pump driven thereby to supply fluid to a reservoir, a switch controlled by the fluid in the reservoir, an automatically-operated master-controller controlled by the fluid-controlled switch, means for controlling the rate of movement of the master-controller, autotransformer-windings, and means controlled by the master-controller for connecting the motor to the source of supply through the autotransformer-windings in one position of the master-controller and for connecting the motor directly to the source of current-supply in another position of the master-controller.

12. In a fluid-pressure system, a source of current-supply, an electric motor, a pump driven thereby, a reservoir supplied by the pump, a controlling device for the motor responsive to the condition of the fluid in the reservoir, autotransformer-windings, and means controlled by the controlling device for first connecting the terminals of the autotransformer-windings to the source of supply and taps from the autotransformer-windings to the motor-terminals, and then connecting the motor-terminals directly to the source of supply.

13. A motor, a source of current-supply, a master-controller, transformer-windings, and means controlled by the master-controller for connecting the motor and source of supply through the transformer-windings in one position of the master-controller and for connecting the motor and the source of supply directly in another position of the master-controller.

14. An electric motor, a source of current-supply, transformer-windings, an automatically-operated master-controller, a main motor-controller controlled by the master-controller and adapted to connect the motor and the source of supply through the transformer-windings in one position of the master-controller and to connect them directly in another position of the master-controller.

15. A source of current-supply, an electric motor, transformer-windings, a pump operated by the motor, a reservoir supplied by the pump, an automatically-operated master-controller controlled by the fluid in the reservoir, a main motor-controller adapted to entirely disconnect the motor from the source of supply in one position of the master-controller, to connect the motor and the source of supply through the transformer-windings in another position of the master-controller, and to connect the motor and source of supply directly in a third position of the master-controller.

16. In an electric motor, a source of current-supply, transformer-windings, an automatically-operated master-controller, a main motor-controller consisting of a plurality of separately-actuated contacts and controlled by the master-controller, these contacts being adapted to connect the motor and the source of supply through the transformer-windings in one position of the master-controller and to connect the motor and the source of supply directly in another position of the master-controller.

17. In a fluid-pressure system, a motor, a pump driven thereby, a reservoir supplied by the pump, a snap-switch adapted to be opened and closed in accordance with the condition of the fluid in the reservoir, a solenoid controlled by the snap-switch, a master-controller operated by the solenoid, means for regulating the rate of movement of the master-controller, a main motor-controller controlled by the master-controller and consisting of a plurality of separately-actuated contacts, a source of current-supply, autotransformer-windings, the main motor-controller being adapted to connect the ends of the autotransformer-windings to the source of supply and taps from the autotransformer-windings to the motor-terminals when the master-controller is in one position, and to connect the motor-terminals directly to the source of supply when the master-controller is in another position.

18. An electric motor, a main controller therefor consisting of a plurality of groups of separately-actuated contacts, a master-controller controlling the operation of the contacts, and adapted in one position to cause one group of contacts to be actuated to supply the motor with current at one potential and in another position to cause another group of contacts to be actuated to supply the motor with current at a higher potential.

19. An electric motor, a main controller therefor consisting of a plurality of groups of switches, a source of supply, autotransformer-windings, one group of said switches adapted when operated to connect the ends of the autotransformer-windings with the source of supply, another group of said switches adapted when in one position to connect the motor-terminals to taps from the autotransformer-winding and in another position to connect the motor-terminals to the source of supply.

20. An electric motor, a main controller therefor consisting of a plurality of groups of contacts, a source of supply, autotransformer-windings, one group of said contacts adapted when operated to connect the ends of the autotransformer-windings with the source of supply, another group of said contacts adapted when in one position to connect the motor-terminals to taps from the autotransformer-winding and in another position to connect the motor-terminals to the source of supply, and a master-controller controlling the operation of the main controller.

21. An electric motor, a main controller therefor consisting of a plurality of pairs of contacts, a source of supply, autotransformer-windings, one pair of said contacts adapted when operated to connect the ends of the autotransformer-windings with the source of supply, another pair of said contacts adapted when in one position to connect the motor-terminals to taps from the autotransformer-winding and in another position to connect the motor-terminals to the source of supply, a master-controller controlling the operation of the main controller, and means for limiting the rate of movement of the master-controller.

22. An electric motor, a main controller therefor consisting of a plurality of groups of contacts, a source of supply, autotransformer-windings, one group of said contacts adapted when operated to connect the ends of the autotransformer-windings with the source of supply, another group of said contacts adapted when in one position to connect the motor-terminals to taps from the autotransformer-winding and in another position to connect the motor-terminals to the source of supply, an electrically-operated master-controller controlling the operation of the main controller, and a float-switch controlling the master-controller.

23. An electric motor, a main controller therefor consisting of a plurality of pairs of contacts, a source of supply, autotransformer-windings, one pair of said contacts adapted when operated to connect the ends of the autotransformer-windings with the source of supply, another pair of said contacts adapted when in one position to connect the motor-terminals to taps from the autotransformer-winding and in another position to connect the motor-terminals to the source of supply, an electrically-operated master-controller controlling the operation of the main controller, a fluid-pressure switch controlling the master-controller, and means for regulating the rate of movement of the master-controller.

24. An electric motor, a main controller therefor consisting of a plurality of groups of contacts, a source of supply, autotransformer-windings, one group of said contacts adapted when operated to connect the ends of the autotransformer-windings with the source of supply, another group of said contacts adapted when in one position to connect the motor-terminals to taps from the autotransformer-winding and in another position to connect the motor-terminals to the source of supply, and a master-controller adapted in one position to cause the operation of said first group of contacts and in another position to cause the operation of said second group of contacts.

25. An electric motor, a main controller therefor consisting of a plurality of groups of contacts, a source of supply, autotransformer-windings, one group of said contacts adapted when operated to connect the ends of the autotransformer-windings with the source of supply, another group of said contacts adapted when in one position to connect the motor-terminals to taps from the autotransformer-winding and in another position to connect the motor-terminals to the source of supply, a solenoid for each contact, and a master-controller adapted in one position to energize the solenoid of said first group of contacts and in another position to energize the solenoids of said second group of contacts.

26. An electric motor, a main controller therefor consisting of a plurality of groups of contacts, a source of supply, autotransformer-windings, one group of said contacts adapted when operated to connect the ends of the autotransformer-windings with the source of supply, another group of said contacts adapted when in one position to connect the motor-terminals to taps from the autotransformer-winding and in another position to connect the motor-terminals to the source of supply, a solenoid for each contact, an automatically-operated master-controller adapted in one position to energize the solenoids of said first group of contacts and in another position to energize the solenoids of said second group of contacts, means for retarding the action of the master-controller, and means for varying the amount of such retardation.

27. In combination, an electric motor, a supply-circuit, an autotransformer, and a plurality of separately-actuated contacts for first connecting the motor to the supply-circuit through the autotransformer and then connecting the motor directly to the supply-circuit.

28. An electric motor, a main controller therefor consisting of a plurality of groups of separately-actuated contacts, all of the contacts of a group being arranged to be operated simultaneously, a master-controller controlling the operation of the contacts, and adapted in one position to cause one group of contacts to be actuated to supply the motor with current at one potential and in another position to cause another group of contacts to be actuated to supply the motor with current at a higher potential.

29. An electric motor, a main controller therefor consisting of a plurality of groups of contacts, all of the contacts of a group being arranged to be operated simultaneously, a source of current-supply, autotransformer-windings, one group of said contacts adapted when operated to connect the ends of the autotransformer-windings with the source of supply, another group of said contacts adapted when in one position to connect the motor-terminals to taps from the autotransformer-winding and in another position to connect the motor-terminals to the source of supply, an electrically-operated master-controller controlling the operation of the main controller, and a float-switch controlling the master-controller.

30. Polyphase transformer-windings connected to a source of polyphase current-supply, taps leading from corresponding points in said windings, a polyphase motor, and separately-actuated contacts simultaneously operated to connect corresponding taps from said windings to the motor in order to supply thereto an alternating current at reduced voltage.

31. A source of alternating current, transformer-windings connected thereto, taps leading from said windings, a translating device, and a plurality of separately-actuated contacts simultaneously operated to connect the taps from the transformer-windings to the translating device.

In testimony whereof I affix my signature in the presence of two witnesses.

CLIFFORD ROSS TATEM

Witnesses:
DAVID HOWELLS,
W. A. JAMES.